United States Patent
Hayashi

(10) Patent No.: US 6,276,114 B1
(45) Date of Patent: Aug. 21, 2001

(54) HIGH-FREQUENCY HEAT-SEALING APPARATUS

(75) Inventor: Kojiro Hayashi, Tokushima-ken (JP)

(73) Assignee: Shikoku Kakoki Co., Ltd. (JP)

( * ) Notice: Subject to any disclaimer, the term of this patent is extended or adjusted under 35 U.S.C. 154(b) by 0 days.

(21) Appl. No.: 09/406,814

(22) Filed: Sep. 28, 1999

(30) Foreign Application Priority Data

Sep. 28, 1998 (JP) .................................................. 10-272783

(51) Int. Cl.⁷ .................................................... B65B 51/22
(52) U.S. Cl. ...................... 53/374.2; 53/565; 53/DIG. 2; 156/580.2; 156/581
(58) Field of Search ............................... 53/371.2, 374.2, 53/DIG. 2; 156/580.2, 581, 565

(56) References Cited

U.S. PATENT DOCUMENTS

| | | | | |
|---|---|---|---|---|
| 4,704,509 | * | 11/1987 | Hilmersson | 53/374.2 |
| 5,250,140 | * | 10/1993 | Hayashi et al. | 53/DIG. 2 |
| 5,564,255 | * | 10/1996 | Giacomelli | 53/371.2 |
| 5,605,026 | * | 2/1997 | Schott et al. | 53/374.2 |
| 5,642,606 | * | 7/1997 | Ohlsson | 53/DIG. 2 |
| 5,714,033 | * | 2/1998 | Hayashi et al. | 53/374.2 |

FOREIGN PATENT DOCUMENTS

| | | |
|---|---|---|
| 55-3215 | 1/1980 | (JP) . |
| 58-134744 | 8/1983 | (JP) . |
| 62-52025 | 3/1987 | (JP) . |
| 1-23366 | 5/1989 | (JP) . |
| 5-269854 | 10/1993 | (JP) . |
| 7-164523 | 6/1995 | (JP) . |
| 8-230834 | 9/1996 | (JP) . |
| 8-244728 | 9/1996 | (JP) . |
| 2571977 | 10/1996 | (JP) . |
| 9-240607 | 9/1997 | (JP) . |

* cited by examiner

Primary Examiner—John Sipos
(74) Attorney, Agent, or Firm—VENABLE; Robert Kinberg

(57) ABSTRACT

A high-frequency heat-sealing apparatus is provided which is capable of achieving a satisfactory seal in which a sealed zone is narrower in its width than at its central portion and in which contaminants such as liquid beverages are not present between thermoplastic material layers over the longitudinal direction of the sealed zone. The apparatus transversely heat-seals a tubular packing material made of a laminate including a synthetic resin layer and a conductive material layer in the presence of a fluid. A ridge shaped to contain an arcuate partial curve in its transverse contour is formed on the action face of a high-frequency coil flush with the flat action face of one of the pressing members for pressing the central portion of a sealed zone having two rounded and narrowed right and left sides. A flash portion for a molten thermoplastic resin is formed adjacent to the outer side of the high-frequency on the cutting side of the coil.

4 Claims, 5 Drawing Sheets

SEALED ZONE

HIGH-FREQUENCY HEAT-SEALING APPARATUS

CROSS REFERENCE TO RELATED APPLICATIONS

Priority is claimed with respect to Japanese Application No. 10/272783 filed Sep. 28, 1998, in the Japanese Patent Office, the disclosure of which is incorporated herein by reference.

BACKGROUND OF THE INVENTION

1. Field of the Invention

The present invention relates to a high-frequency heat-sealing apparatus for use in a filling/packing machine for producing liquid beverages or the like which are packed in paper containers so that they can be stored for a long time and, more particularly, to a sealing apparatus for transversely heat-sealing a tubular packing material filled with fluid contents, such as liquid beverages, in the presence of the fluid contents.

2. Description of the Related Art

Hitherto, when a packing container having a box shape filled with a liquid such as juice in a sealed manner is to be produced, as seen in Japanese Patent Publication No. 3215/1980, it is well known to use a sealing apparatus in which a packing material of a laminate of paper, an aluminum foil and a synthetic resin is used and continuously formed into a tubular shape while being conveyed. The tubular packing material is transversely heat-sealed in the presence of the fluid, by using pressing means including a sealing jaw having a high-frequency coil and an opposing jaw having a sealing rubber made of a hard rubber, and is cut between two sealed zones, having been heat-sealed, by a cutting blade.

In Japanese Patent Laid-Open Patent Application Nos. 134744/1983, 269854/1993, 164523/1995 and 240607/1997, there is further disclosed a heat-sealing apparatus for heat-sealing a laminate material in which a ridge having a rectangular shape in the cross section is formed on the action face of a high-frequency coil on a sealing jaw in the aforementioned heat-sealing apparatus so that the molten resin is extruded into a sealed zone by the ridge.

In the aforementioned heat-sealing apparatus, when the molten resin is guided to flow toward the container's interior side of the sealed portion of the tubular packing material, corrugated molten resin beads are formed on the edge portion of the container's interior side, so that cracks start from the crests of the beads to break the container when an external force is applied to the container. In order to avoid this problem, two magnetic members are arranged on the outer side (or on the container's interior side) of the straight portions of a U-shaped high-frequency coil to leave the portion of the container inner side unheated, as disclosed in Japanese Patent No. 2,571,977.

In Japanese Patent Laid-Open Patent Application No. 230834/1996, it is described that in the aforementioned heat-sealing apparatus a high-frequency coil, which has a ridge in its longitudinal direction and grooves formed on the two sides of and in parallel with the ridge, molten resin is caused to remain in the grooves without flowing out of the sealed zone, even if the resin on the packing material is melted and pushed by the ridge.

In Japanese Patent Laid-Open Patent Application No. 244728/1996, a high-frequency coil is used which is inclined gradually as the sealed zone forming portion approaches the outer side (the container's interior side). The tube is thus heat-sealed whereby the liquid and the molten resin are discharged smoothly from the sealed zone to the container's interior side, when the tube is pressed together in the presence of a fluid.

In Japanese Patent Laid-Open Patent Application No. 52025/1987, it is disclosed that when an electric current flows in a high-frequency coil, a high-frequency electromagnetic field is generated around the high-frequency coil and induces an eddy current in a conductive material such as an aluminum foil, so that heat is generated in the conductive material by the eddy current to heat and melt a thermoplastic resin adjacent to the conductive material. However, the eddy current thus induced establishes a rounded electric circuit at each of the two end portions of the conductive material such as an aluminum foil, so that the heated regions at the two end portions are also rounded, thus narrowing the width of the thermoplastic material layer to be melted at the two end portions. There is also disclosed a high-frequency coil which has a linear ridge for pushing the center parts of the sealed zone, at the two narrowed right and left side portions or at the non-side portion of the sealed zone.

In order to effect the heat-sealing properly in a high-frequency heat-sealing apparatus for transversely heat-sealing a tubular packing material filled with contents such as a liquid beverage in the presence of the liquid, it is necessary to push the thermoplastic material layers melted by the high-frequency heating, with a ridge provided on the high-frequency coil and to extrude the molten thermoplastic resin together with contaminants such as liquid beverages existing between the thermoplastic material layers, from under the ridge to the two sides of the same, thereby forming a thin layer of the thermoplastic resin containing no contaminant below the ridge.

Here, if the tubular packing material having an aluminum foil is heated with the U-shaped high-frequency coil, as described in Japanese Patent Laid-Open No. 52025/1987, there is established a heating pattern forming a loop. As a result, the two right and left side portions of the sealed zone in the longitudinal direction are made narrower than at the non-side portion. For example, when the heat-sealing is effected by using a high-frequency heat-sealing apparatus which is equipped with a high-frequency coil having a linear ridge of a mismatched heating pattern such as a linear ridge for pushing the widthwise center of the non-side portion of the sealed zone, the ridge may push the non-molten region of the two right and left end portions of the tubular packing material, thus causing a problem that defective sealing may occur.

SUMMARY OF THE INVENTION

An object of the invention is to provide a high-frequency heat-sealing apparatus capable of achieving satisfactory sealing, in which a sealed zone is narrower than at the non-side portion and in which contaminants such as liquid beverages are not present between thermoplastic material layers over the whole area of the longitudinal direction of the sealed zone including the two right and left side portions of the sealed zone in the longitudinal direction in the high-frequency heating.

We, the present inventors, have made a prototype heat-sealing apparatus based on the finding that the satisfactory heat sealing can be achieved by guiding the contaminants such as liquid beverages, as might otherwise remain in a thermoplastic material layer for the sealed zone, especially, in the corrugations of its surface at the time of heat-sealing, to flow out of the sealed zone together with the molten thermoplastic resin, thereby forming a thin layer of the thermoplastic resin containing no contaminant, in the sealed zone. It is also found that when such a heat-sealing apparatus is used, a tunnel is occasionally formed in the folds to be formed at the two right and left end portions of the tubular packing material. In order to crush that tunnel, we have developed a heat-sealing apparatus in which two short linear ridges capable of pushing the center of the two narrowed right and left end portions of the sealed zone are formed on the high-frequency coil.

When such a high-frequency heat-sealing apparatus is used, it has been confirmed that the contaminants such as liquid beverages existing between the thermoplastic material layers at the heat-sealing time can be guided to flow out of the sealed zone (to the cutting side) together with the molten thermoplastic resin, thereby forming the thin layer made of the thermoplastic resin containing no contaminant in the sealed zone, and that the aforementioned right and left ridges can crush the tunnel, as might otherwise be occasionally formed at the folds to be formed at the two right and left end portions of the tubular packing material, to effect the satisfactory heat-sealing.

On the basis of the aforementioned findings of the high-frequency heat-sealing apparatus developed by us, we have made keen investigations so as to solve the aforementioned problems and completed the invention by finding that more excellent high-frequency heat-sealing can be achieved while solving the aforementioned problems by using a ridge containing a partial curve capable of pushing the center of the two right and left side portions of such a sealed zone in the longitudinal direction in the high-frequency heating, in which its width is gradually rounded and narrowed more than at the non-side portion.

The present invention relates to a high-frequency heat-sealing apparatus comprising a pair of openable-and-closable pressing members including a high-frequency heating mechanism for shaping a packing material of a laminate including a synthetic resin layer and a conductive material layer into a tubular shape and for heat-sealing the tubular packing material transversely together in the presence of the fluid, wherein a ridge shaped to contain an arcuate partial curve in its transverse contour is so formed on the action face of a high-frequency coil flush with the flat action face of one of the pressing members that it can press the central portion of a sealed zone having two rounded and narrowed right and left sides, and wherein a flash portion for a molten thermoplastic resin is formed adjacent to the outer side on the cutting side of the high-frequency coil.

In the aforementioned high-frequency heat-sealing apparatus, the ridge is one continuous linear ridge containing the partial curve, or a band-shaped magnetic member is provided adjacent to the outer side of the high-frequency coil on the side of a container.

DETAILED DESCRIPTION OF THE PREFERRED EMBODIMENTS

Figure 1:
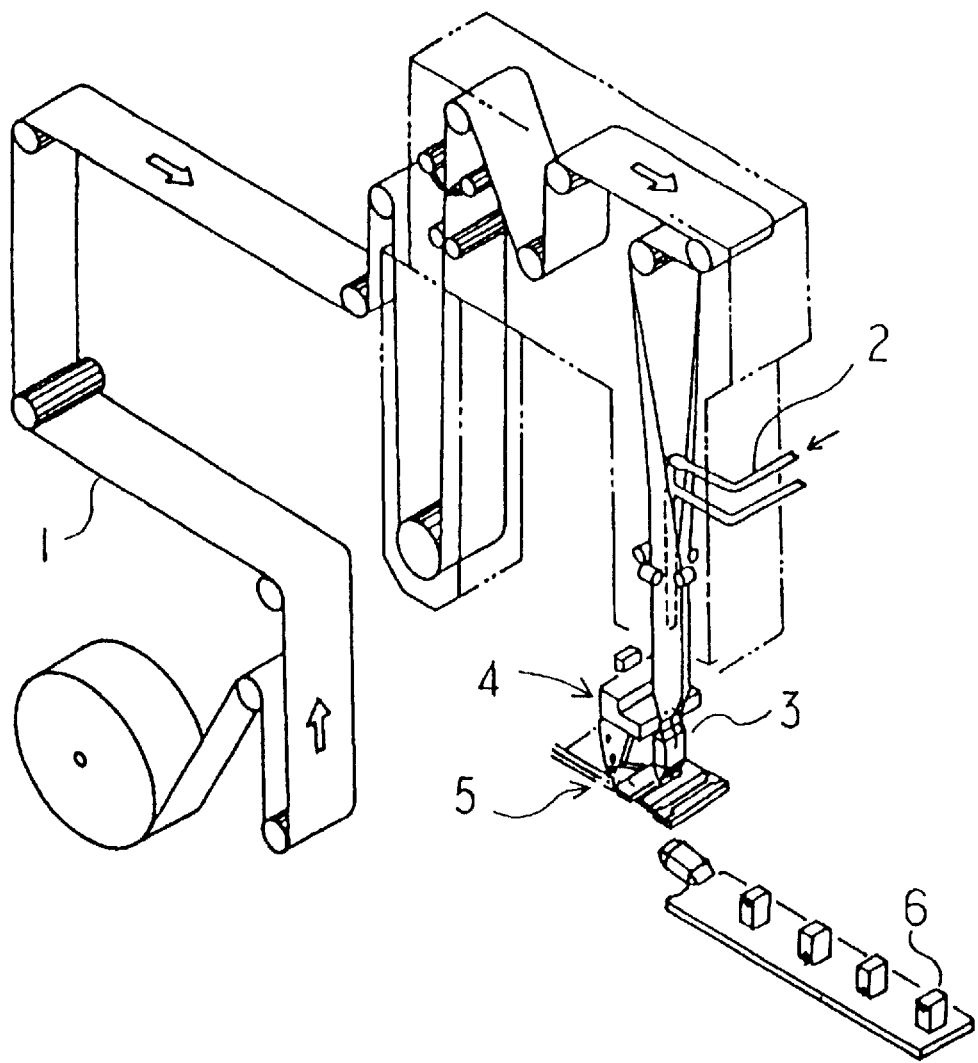
FIG. 1 is a schematic perspective view of a filling/packing machine.

A filling/packing machine, in which a high-frequency heat-sealing apparatus according to the invention is used, can be implemented, as shown in FIG. 1, by a filling/packing machine comprising: a roll supporting a packing material web 1 in a roll shape; an unwinding apparatus for unwinding the web sequentially from the roll; a tube shaping apparatus for shaping the unwound web, after being sterilized, into a tubular shape; a liquid supply pipe 2 for filling the tubular web with a fluid content; a transverse sealing apparatus 4 for transversely sealing the tube filled with the content, while being fed downward by a length substantially corresponding to one container, to continuously form pillow-shaped containers 3; a cutting apparatus 5 disposed below the transverse sealing apparatus for cutting the sealed portions of the pillow-shaped containers in the suspended state to separate the containers one by one; and a container shaping apparatus for bending the end portions of the separated pillow-shaped containers 3, to shape them into box-shaped containers 6 in a final shape.

Figure 2:
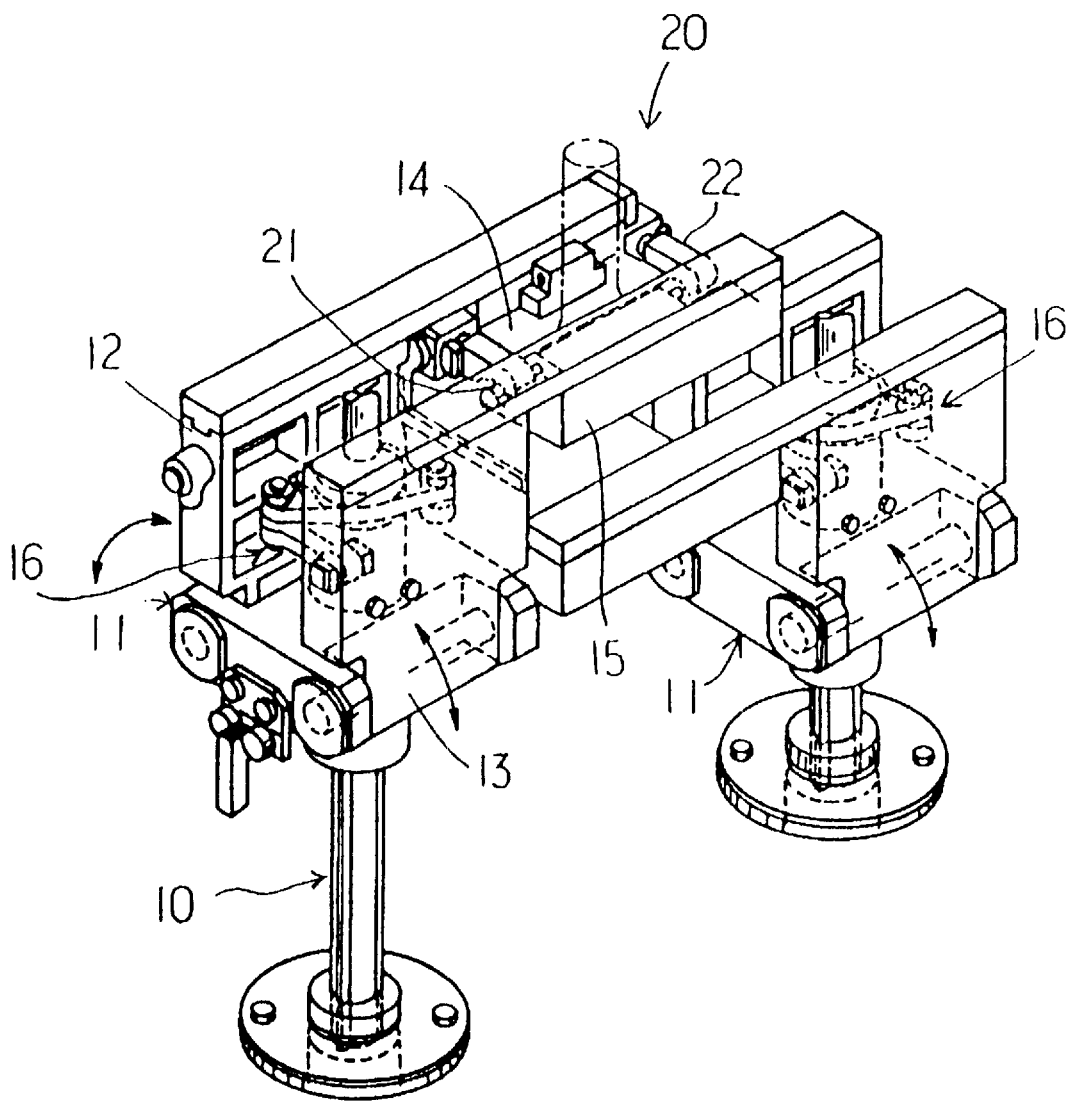
FIG. 2 is a perspective view of a transverse sealing apparatus.

A transverse sealing apparatus 4 that can be used for implementing the invention is disclosed, for example, in Japanese Patent Publication No. 23366/1989. This transverse sealing apparatus 4 is constructed, as shown in FIG. 2, to include: a vertical rod 10 made movable up and down and rotatable back and forth; a lift frame 11 made movable up and down together with the vertical rod 10 and mounted on the vertical rod 10; a pair of front and back rocking arms 12 and 13 individually supported on the lift frames 11 so that they can rock at their lower portions on a pair of horizontal axes parallel to each other; pressing members 14 and 15 provided with a pair of front and back high-frequency coils individually fixed to oppose each other on the upper portions of the individual rocking arms 12 and 13; an arm opening/closing device 16 for rocking the two rocking arms 12 and 13 between a closed position, in which the two pressing members 14 and 15 approach each other, and an open position in which they are apart from each other; and a press apparatus 20 for pulling the two rocking arms 12 and 13 to each other in the closed position to generate a sealing pressure between the two pressing members 14 and 15.

According to the invention, the invention, such paired openable-and-closable pressing members of the transverse sealing apparatus 4 for sealing the tubular packing material transversely together the presence of a fluid, are equipped with the high-frequency coils and have a ridge shaped to contain a curve in a portion of the action face. By pressing the tubular packing material transversely in the presence of the fluid, with the above described paired openable-and-closable pressing members, a heated and pressurized sealed zone is formed in the innermost synthetic resin layer of the packing material, thereby effecting the heat-sealing.

The packing material used with the invention, is preferably made of a laminate including a synthetic resin layer and a conductive material layer and may be any of laminate which includes a synthetic resin layer such as polyethylene, capable of heat-sealing on its innermost face by heating means, and a conductive material layer to be heated by high-frequency heating. The conductive material layer is preferably made of an aluminum foil layer for preventing light or oxygen from entering the inside of a container. From the standpoint of keeping the rigidity of the container, it is preferable to use a laminate having a paper sheet layer. Moreover, this packing material is shaped into a tubular shape by thermally welding its longitudinal end edge portions without any liquid being present by a method known in the related art.

Figure 3:
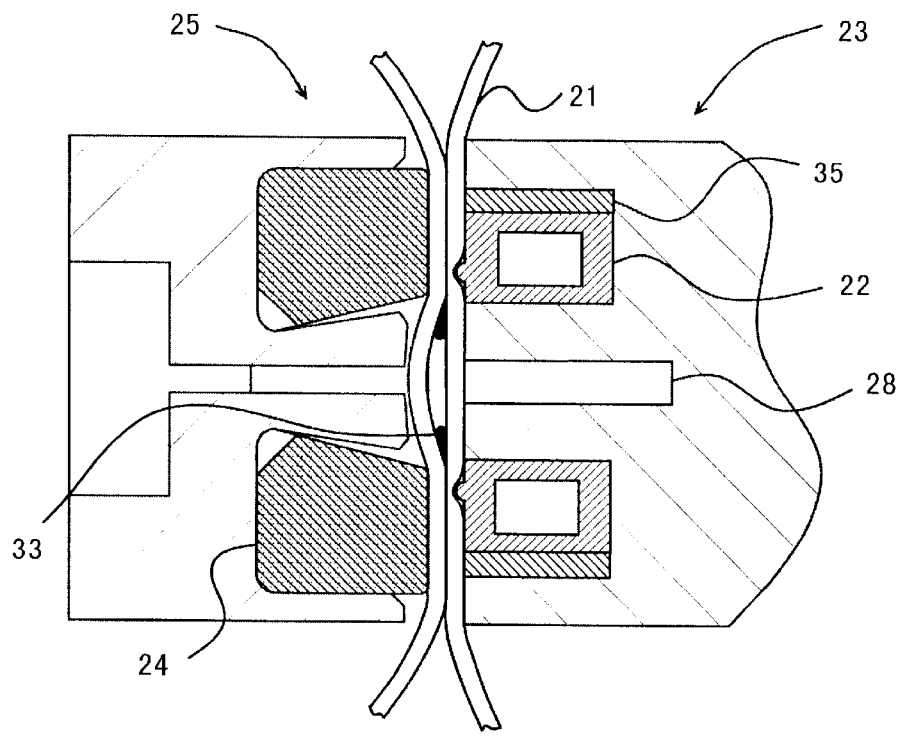
FIG. 3 is a schematic longitudinal section through a central portion of a sealed zone of a high-frequency heat-sealing apparatus of the invention.
Figure 4:
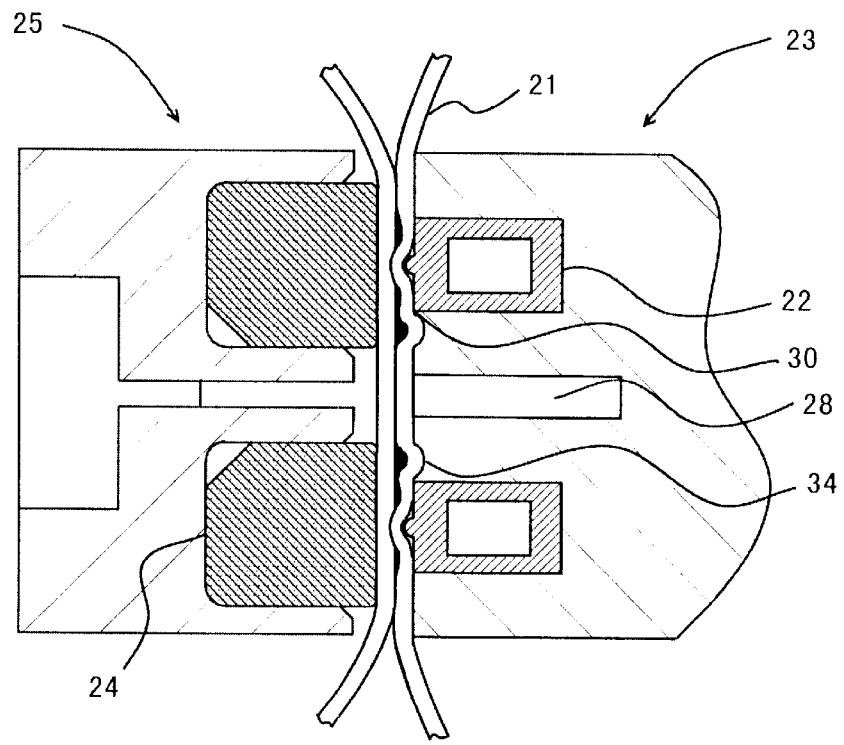
FIG. 4 is a schematic longitudinal section through a central portion of a sealed zone of the high-frequency heat-sealing apparatus of the invention.

The high-frequency heat-sealing apparatus of the invention is constructed, as shown in FIGS. 3 and 4, to include the paired openable-and-closable pressing members which are equipped with a high-frequency heating mechanism for heat-sealing such a tubular packing material 21 transversely with the fluid present. The paired pressing members in this high-frequency heat-sealing apparatus are usually composed of a pressing member 23 (herein called the "sealing jaw") equipped with a high-frequency coil 22 as the heating source, and a pressing member 25 (herein called the "opposing jaw") not equipped with the same, but made of a rigid rubber 24 or the like. Moreover, the sealing jaw 23 for pressing the tubular packing material 21 and the opposing jaw 25 are formed to have flat action faces, and the high-frequency coil 22 is so buried in the sealing jaw 23, so that its action face is flushed with that of the sealing jaw to form a common flat face.

Figure 5:
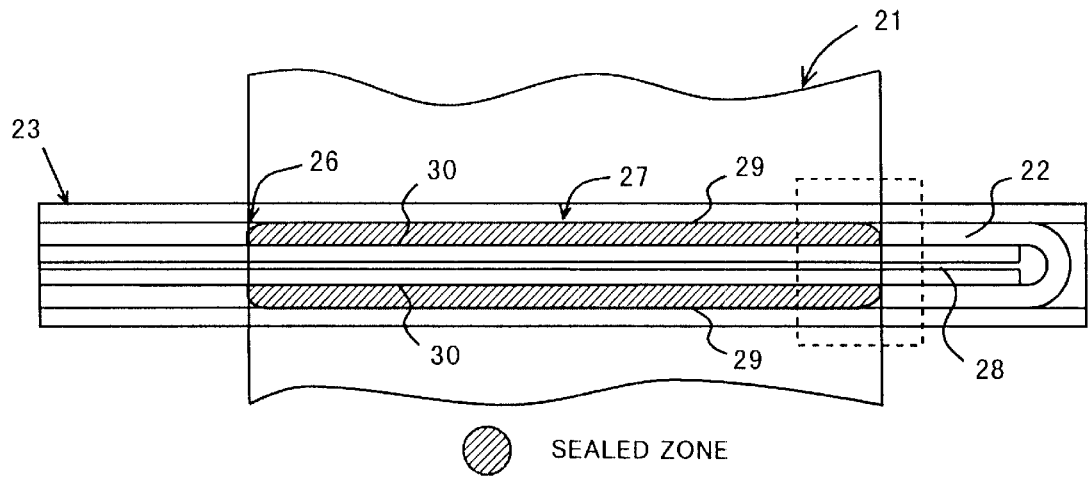
FIG. 5 is an explanatory diagram of the sealed zone of a high-frequency heat-sealing.
Figure 6:
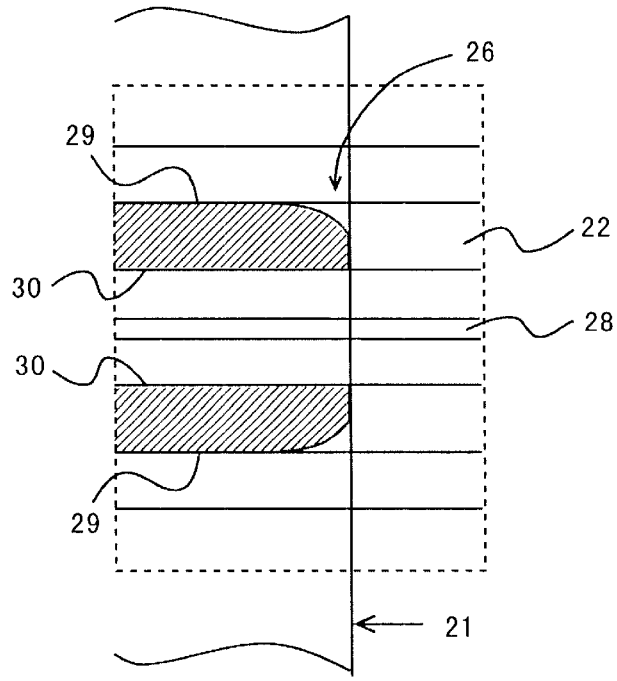
FIG. 6 is an enlarged diagram of a portion of FIG. 5.

In the high-frequency heat-sealing apparatus of the invention, the high-frequency heating mechanism is used as the means for heating the tubular packing material, as described hereinbefore, and is equipped with the high-frequency coil. When an electric current flows through the high-frequency coil 22 disposed in the sealing jaw 23, as shown in FIG. 5 and FIG. 6 presenting an enlarged diagram of a portion of the former, a high-frequency electromagnetic field is generated around the high-frequency coil, which induces an eddy current in the conductive material such as an aluminum foil. Heat is then generated in the conductive material by the eddy current, which heats and melts a thermoplastic resin adjacent to the conductive material. The eddy current thus induced forms a round electric circuit at the two end portions of the conductive material such as the aluminum foil, thereby rounding the heated regions of the two right and left side portions of the tubular packing material 21 so that the width of the thermoplastic material layer to be melted at the two end portions is narrowed. As a result, the sealed zone is rounded and narrowed at its two longitudinal right and left side portions 26 so that it is narrower than at its non-side portion 27.

Here, the sealed zone is termed as the heat-sealed zone in which heat and pressure are applied to the synthetic resin layers of the innermost faces of the packing material. Therefore, the region which is pressed but not heated, or the region which is heated but not pressed, is not part of the sealed zone. In FIG. 5 or 6, the sealed zone is conveniently laid over the sealing jaw 23, when the sealing jaw is equipped with the U-shaped high-frequency coil 22 so that two portions of the tubular packing material are simultaneously heat-sealed through a portion 28 to be cut. Of the end edge portions of the heat-sealing apparatus of this kind in the direction (or the longitudinal direction of the tube) perpendicular to the longitudinal direction (or the transverse direction of the tube) of the sealed zone, as shown in FIG. 5 or 6, one end edge portion 29 is located on the side of a filler such as juice, i.e., on the container's interior side, whereas the other end edge portion 30 is located on the cutting side for cutting off the containers one by one. Here in this invention, the action face of the high-frequency coil of the pressing member corresponding to that sealed zone may be conveniently called the sealed zone.

Figure 7:
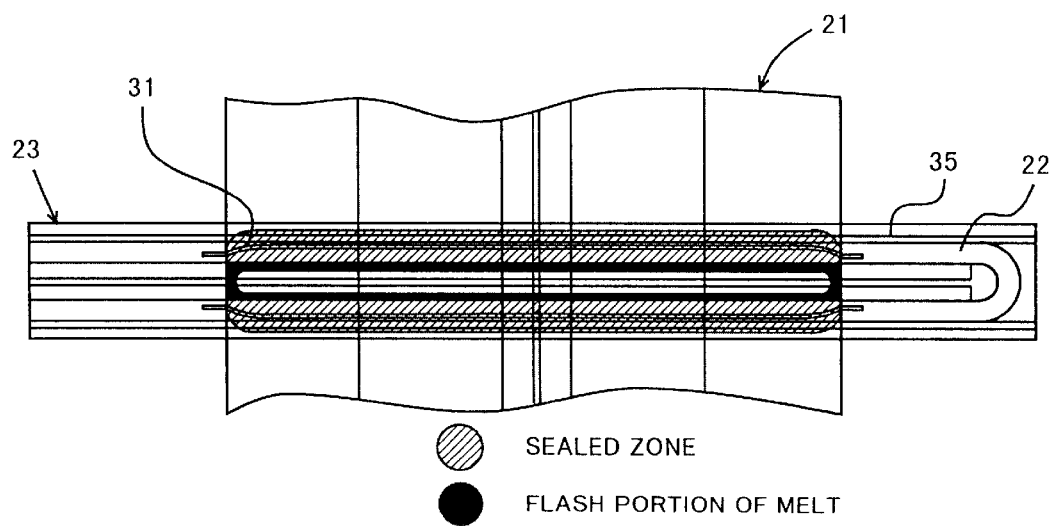
FIG. 7 is an explanatory diagram of a high-frequency heat-sealing apparatus of the invention, which is equipped with a high-frequency coil having one linear ridge.
Figure 8:
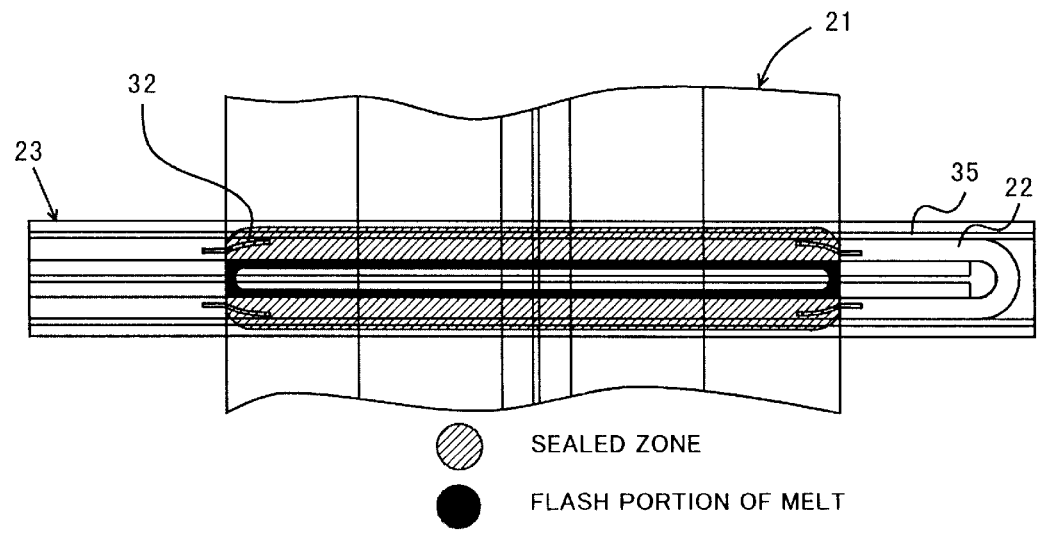
FIG. 8 is an explanatory diagram of a high-frequency heat-sealing apparatus of the invention, which is equipped with a high-frequency coil having two short ridges.

The invention is characterized in that a ridge shaped to contain a partial curve is so formed on the action face of the high-frequency coil as to press the central portion of the sealed zone on the two right and left sides where the width of the sealed zone is rounded and narrowed. This ridge having the partial curve can be exemplified either by one continuous linear ridge 31 which is continuous even in the non-side portion, as shown in FIG. 7, or by two short ridges 32 which are not formed in the non-side portion, but only on the two right and left sides, as shown in FIG. 8. The ridge pressing portion in the invention is shaped to have such an arcuate contour in its transverse section so as to prevent the packing material from being damaged when pressed, as shown in FIGS. 3 and 4.

Thus in the invention, the ridge is shaped to contain an arcuate partial curve in its transverse contour so that it can press the central portion of the sealed zone having the two rounded and narrowed right and left sides. Therefore, it is possible to prevent the packing material from being damaged when pressed and to prevent reliably the sealing from being defective due to formation of a tunnel, as might otherwise be caused either by the two right and left folded ends of the tubular packing material pressed or by the creases (or folds) formed in advance in the packing material.

Moreover, the flash portion for the molten thermoplastic resin to be formed adjacent to the outer side of the cutting side of the high-frequency coil is exemplified in FIG. 3. The paired pressing members are provided with the sealing jaw 23 and the opposing jaw 25, which have a flash portion 33 formed adjacent to the outer end edge portion 30 on the cutting side of the high-frequency coil 22 and provided for the molten thermoplastic resin so that only a part of the action face of the sealing jaw 23 abuts against the active face of the opposing jaw 25. The pressing members having that flash portion 33 are different from the paired pressing members having the sealing jaw and the opposing jaw, in which the heating region is contained in its entirety within the pressure zone so that there is an overlap between the sealed zone and the heating region so that the action face of the sealing jaw abuts wholly against the action face of the opposing jaw. With the pressing members that have the flash portion 33, the action face of the sealing jaw 23 abuts only partially against the action face of the opposing jaw 25. As a result, the sealed zone is smaller than the heating region.

Figure 4 shows another flash portion in the invention for the molten thermoplastic resin which is formed adjacent to the outer side of the cutting side of the high-frequency coil. In FIG. 4, the pair of pressing members are provided with a flash portion formed by a groove 34 provided in the action face of at least one of the pressing members composed of the sealing jaw 23 and the opposing jaw 25 for forming a synthetic resin bulge adjacent to the outer end edge portion 30 on the cutting side of the sealed zone.

By providing such flash portion in the invention, the synthetic resin layer on the innermost face of the packing material in the sealed zone is melted by the action of the pressing members having the heating mechanism so that it is carried toward the cutting side together with the impurities such as the filler, e.g., juice or contaminants having adhered to the surface of that synthetic resin layer. As a result, a thin synthetic resin layer not having any contaminant but having an excellent sealing property is formed in the sealed zone. No matter whether the high-frequency coil might have one linear ridge 31 continuing even in the non-side portion, as shown in FIG. 7, or two short ridges 32 only on the two right and left sides, as shown in FIG. 8, satisfactory heat-sealing can be achieved even in the non-side portion without any ridge.

In the high-frequency heat-sealing apparatus of the invention, a magnetic member 35 made of band-shaped or sheet-shaped ferrite or the like is desirably disposed adjacent to the outer side, as located on the container's interior side, of the high-frequency coil having a flat action face, as shown in FIG. 3 or FIGS. 7 and 8. By this band-shaped magnetic member 35 adjacent to the outer side on the container's interior side, the magnetic lines of force, as emitted from the high-frequency coil, are deflected toward the sealed zone so that the outer side of the tubular packing material, as located at the high-frequency coil on the container's interior side, that is, the end edge portion of the sealed zone on the container's interior side is not heated to an unnecessary temperature.

According to a invention, there is formed the ridge shaped to contain an arcuate partial curve in its transverse contour so that it can press the central portion of the sealed zone having the two rounded and narrowed right and left sides. Therefore, it is possible to prevent the packing material from being damaged when pressed and to prevent reliably the sealing from being defective due to formation of a tunnel, as might otherwise be caused either by the two right and left folded ends of the tubular packing material pressed or by the creases (or folds) formed in advance in the packing material. Since a flash portion is provided adjacent to the outer side on the cutting side, the synthetic resin layer on the innermost face of the packing material in the sealed zone is melted by the action of the pressing members having the heating mechanism so that it is carried toward the cutting side together with the impurities such as the filler, e.g., juice or contaminants having adhered to the surface of that synthetic resin layer. As a result, a thin synthetic resin layer not having any contaminant but having an excellent sealing property is formed in the sealed zone so that a more satisfactory heat seal can be achieved.

What is claimed is:

1. A high-frequency heat-sealing apparatus for heat-sealing a tubular packing material, comprised of a laminate including a synthetic resin layer, in a direction transverse to an axial direction of the tubular packing material, the heat sealing occurring in the presence a fluid content within the tubular packing material, the apparatus comprising:

a pair of pressing members having an open position and a closed position pressing against one another, the pressing members including flat action faces extending in the transverse direction of the heat seal to be formed, one of the pressing members including a high-frequency heating mechanism having an action face that is flush with the action face of the one pressing member for heat-sealing the tubular packing material in the transverse direction by applying heat and pressure to the tubular packing material in the closed position of the pressing members to form a sealed zone having opposite, rounded side portions that are narrower in width than a non-side region of the sealed zone located between the opposite, rounded side portions, the action face of the heating mechanism including a ridge having a contour extending in said transverse direction and including an arcuate partial curve in its transverse contour for pressing a central region of the opposite, rounded side portions, the pair of pressing members including a flash portion such that in the closed position of the pressing members heat, without pressure, is applied to the tubular packing material so that molten thermoplastic resin is carried outside the sealed zone to an outer side of the high-frequency heating mechanism that is remote from an interior region of the tubular packing material containing the fluid content.

2. The high-frequency heat sealing apparatus according to claim 1, wherein the high-frequency mechanism comprises a high-frequency coil and further comprising a band-shaped magnetic member provided adjacent to an outer side of the high-frequency coil closest to the interior of the tubular packing material.

3. The high-frequency heat sealing apparatus according to claim 1, wherein the ridge is one continuous linear ridge containing the partial curve.

4. The high-frequency heat sealing apparatus according to claim 3, wherein the high-frequency mechanism comprises a high-frequency coil and further comprising a band-shaped magnetic member provided adjacent to an outer side of the high-frequency coil closest to the interior of the tubular packing material.

* * * * *